(12) United States Patent
Nagasawa et al.

(10) Patent No.: US 11,097,933 B2
(45) Date of Patent: Aug. 24, 2021

(54) CARRYING APPARATUS

(71) Applicant: TOYOTA JIDOSHA KABUSHIKI KAISHA, Toyota (JP)

(72) Inventors: Katsuhiko Nagasawa, Aichi-ken (JP); Rui Suzuki, Ichinomiya (JP); Daiji Sone, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/517,972

(22) Filed: Jul. 22, 2019

(65) Prior Publication Data
US 2020/0095103 A1    Mar. 26, 2020

(30) Foreign Application Priority Data

Sep. 20, 2018 (JP) .............. JP2018-175956

(51) Int. Cl.
*B66F 9/10* (2006.01)
*B66F 9/075* (2006.01)
(Continued)

(52) U.S. Cl.
CPC ............ *B66F 9/10* (2013.01); *B66F 9/07513* (2013.01); *B66F 9/087* (2013.01); *B66F 9/125* (2013.01); *B65G 1/0407* (2013.01)

(58) Field of Classification Search
CPC .... B66F 9/147; B66F 9/10; B66F 9/14; B66F 9/07513; B66F 9/08; B66F 9/087;
(Continued)

(56) References Cited

U.S. PATENT DOCUMENTS 3,299,983 A * 1/1967 Hubbard ............... B66F 11/046
                                                  182/2.11
3,612,293 A * 10/1971 Ostrander ............ B65G 1/0421
                                                  212/284
(Continued)

FOREIGN PATENT DOCUMENTS

CN    205916988 U    2/2017
CN    206750727 U    12/2017
(Continued)

OTHER PUBLICATIONS

Communication dated Nov. 30, 2020 from the State Intellectual Property Office of People's Republic of China in Application No. 201910650385.9.

*Primary Examiner* — Glenn F Myers
(74) *Attorney, Agent, or Firm* — Sughrue Mion, PLLC

(57) ABSTRACT

A swivel base is provided on a trolley so as to be able to swivel around a vertical axis, and a fork can be slid in a horizontal direction between an advanced position and a retracted position by a sliding mechanism capable of moving up and down along a pillar erected on the swivel base. Thus, it is possible to realize a configuration in which an empty-box skid is loaded in one direction and unloaded in another direction by means of the swiveling swivel base, without employing a configuration in which a plurality of members is supported so as to be able to swivel around different vertical axes. A movable range of the sliding mechanism (a movable range of the fork) in a vertical direction is therefore not significantly limited, and a transfer position of the empty-box skid in the vertical direction can be set to a lower position.

3 Claims, 13 Drawing Sheets

(51) Int. Cl.
*B66F 9/12* (2006.01)
*B66F 9/08* (2006.01)
*B65G 1/04* (2006.01)

(58) Field of Classification Search
CPC .......... B66F 9/122; B66F 9/125; B66F 9/105; B66F 9/07; B66F 9/063; B66F 9/141; B66F 9/145; B65G 1/0407; B65G 1/0428; B65G 1/06; B65G 1/0435
USPC .............................. 901/1; 212/204, 348, 333
See application file for complete search history.

(56) References Cited

U.S. PATENT DOCUMENTS

| | | | | |
|---|---|---|---|---|
| 3,638,810 A | * | 2/1972 | Mathew | B66F 9/10 414/544 |
| 3,854,616 A | * | 12/1974 | Willis | B65G 1/0407 414/607 |
| 7,980,806 B1 | * | 7/2011 | Conner | B66F 9/0655 414/589 |
| 2002/0088665 A1 | * | 7/2002 | Brown | B66F 9/10 180/418 |
| 2005/0053450 A1 | * | 3/2005 | Kantola | B66F 9/07 414/273 |
| 2013/0209203 A1 | * | 8/2013 | Rafols | B66F 9/0755 414/279 |
| 2018/0022548 A1 | * | 1/2018 | Mattern | B66F 9/07 414/279 |
| 2019/0391269 A1 | * | 12/2019 | Bartlett | G01S 17/87 |

FOREIGN PATENT DOCUMENTS

| | | |
|---|---|---|
| JP | 10-297714 A | 11/1998 |
| JP | 2003-054705 A | 2/2003 |
| JP | 2016-210518 A | 12/2016 |

* cited by examiner

CARRYING APPARATUS

INCORPORATION BY REFERENCE

The disclosure of Japanese Patent Application No. 2018-175956 filed on Sep. 20, 2018 including the specification, drawings and abstract is incorporated herein by reference in its entirety.

BACKGROUND

1. Technical Field

The present disclosure relates to a carrying apparatus. More particularly, the present disclosure relates to an improvement on a carrying apparatus having a swivel base that is mounted on a trolley and is capable of swiveling around a vertical axis.

2. Description of Related Art

A carrying apparatus for carrying a load placed thereon is known that, as disclosed in Japanese Patent Application Publication No. 10-297714 (JP 10-297714 A), has a swivel base that is mounted on a trolley and is capable of swiveling around a vertical axis, and allows a load to be loaded in one direction and unloaded in another direction by means of the swiveling swivel base.

JP 10-297714 A discloses a carrying apparatus including: a trolley (which is called a traveling base in JP 10-297714 A) that travels along a travel path; a swivel base which is supported on the trolley so as to be able to swivel around a first vertical axis (perpendicular axis) and on which a pillar is erected; an elevating stage capable of moving up and down along the pillar; an arm supported by the elevating stage so as to be able to swivel around a second vertical axis offset from the first vertical axis; a hand support body supported by the arm so as to be able to swivel around a third vertical axis offset from the second vertical axis; and a load hand supported by the hand support body.

SUMMARY

The carrying apparatus disclosed in JP 10-297714 A has a configuration in which the swivel base, the arm, and the hand support body are supported so as to be able to swivel around different vertical axes. Therefore, even when the elevating stage that moves up and down along the pillar is moved down to the lowest position, the position of the load hand is still high due to the respective height dimensions of the elevating stage, the arm, and the hand support body. Thus, the movable range of the load hand in the vertical direction is limited, which puts a restriction on setting a lower position as the transfer position in the vertical direction of a load held by the load hand.

For example, there is a constraint that, for the carrying apparatus to receive a load placed on a transportation trolley, the level of an upper surface of the transportation trolley (the surface on which the load is placed) needs to be set to a relatively high level matching the level of the load hand located at the lowest position.

The present disclosure provides a carrying apparatus that allows a load transfer position in a vertical direction to be set to a lower position.

An aspect of the present disclosure relates to a carrying apparatus for carrying a load placed thereon. This carrying apparatus includes: a trolley configured to travel; a swivel base provided on the trolley so as to be able to swivel around a vertical axis; a pillar erected on the swivel base and extending in a vertical direction; a holding member configured to hold the load; and a sliding mechanism capable of moving up and down along a first extension direction of the pillar and configured to slide the holding member in a horizontal direction between an advanced position at which the load is handed over and a retracted position at which the load is located above the swivel base.

In this configuration, a load is held (received) by the holding member as follows: The sliding mechanism moves up or down along the first extension direction of the pillar and thereby moves the holding member to a level at which the load is received. For example, in the case where the load is a skid that is a pallet with a plurality of boxes placed thereon, the holding member is moved to the level of the pallet. Then, the sliding mechanism slides the holding member to the advanced position (the position at which the load is received), and the holding member receives and holds the load. Thereafter, the sliding mechanism slides the holding member to the retracted position (the position at which the load is located above the swivel base), and the load is carried in this state by the traveling trolley.

A load held by the holding member is unloaded (e.g., unloaded onto a chute) as follows: The sliding mechanism moves up or down along the first extension direction of the pillar and thereby moves the holding member to a level at which the load is unloaded (discharged). In this case, if a load receiving direction in which the load is received and a load unloading direction are different from each other, the swivel base is swiveled around the vertical axis such that the load faces the unloading direction. For example, in the case where the load is the skid, the swivel base is swiveled such that the skid faces the unloading direction, and the holding member is moved until the pallet is located at the level of a predetermined placing surface (e.g., an upper surface of the chute). Then, the sliding mechanism slides the holding member to the advanced position (the position at which the load is unloaded), and the load is unloaded from the holding member (e.g., unloaded onto the chute).

A load carrying operation is thus performed. While the swivel base is provided on the trolley so as to be able to swivel around the vertical axis, the holding member is driven by the sliding mechanism to move in the vertical direction (move in the vertical direction as the sliding mechanism moves up and down) and to move in the horizontal direction. This means that the carrying apparatus does not have a configuration in which a plurality of members is supported so as to be able to swivel around different vertical axes (the configuration of the carrying apparatus of JP 10-297714 A). There is therefore no member (member supported so as to be able to swivel around the vertical axis) that constitutes an obstacle to lowering the lowest position to which the sliding mechanism can be moved along the pillar. As a result, the movable range of the sliding mechanism in the vertical direction (the movable range of the holding member in the vertical direction) is not significantly limited, and the load transfer position in the vertical direction can be set to a lower position.

The above carrying apparatus may further include a control unit that controls the sliding mechanism. The erection position of the pillar may be set to a position offset from the center of swiveling of the swivel base. When the holding member is at the retracted position, the load held by the holding member may be located above the center of swiveling. The control unit may be configured to control the sliding mechanism so as to move the holding member to the retracted position before the swivel base swivels.

Thus, the holding member is moved to the retracted position before the swivel base swivels, and the load is located above the center of swiveling while the load is held by the holding member. This means that the swivel base is swiveled in a state where the center of swiveling of the swivel base and the position of the center of gravity of the load are close to each other, which allows the swivel base to swivel while the load is stably held.

The sliding mechanism may include a guide member extending toward one side and the other side of the pillar in a horizontal direction and configured to be able to move up and down along the first extension direction of the pillar. The holding member may be configured to be able to slide in a horizontal direction along a second extension direction of the guide member.

Thus, when the holding member is moved to the advanced position by the sliding mechanism, the holding member can be located on one side of the pillar in the horizontal direction along the second extension direction of the guide member, and when the holding member is moved to the retracted position by the sliding mechanism, the holding member can be located on the other side of the pillar in the horizontal direction along the second extension direction of the guide member. This means that the holding member has a wide movable range by being able to move toward both one side and the other side of the pillar in the horizontal direction. Since the holding member can be moved to above the center of swiveling of the swivel base, the carrying apparatus can carry a large-sized load.

The trolley may have a bottom plate and a vertical wall extending vertically upward from an outer edge of the bottom plate. The carrying apparatus may include a swivel driving mechanism installed on the bottom plate. The swivel base may be mounted on an upper side of the swivel driving mechanism and configured to be able to swivel by receiving power directed around the vertical axis from the swivel driving mechanism. A lower surface of the swivel base may be located at a level higher than the level of an upper end of the vertical wall of the trolley by a predetermined dimension.

Thus, when the swivel driving mechanism is activated to swivel the swivel base, the swivel base can swivel without interfering with the vertical wall of the trolley by passing above the vertical wall even when the length dimension of the swivel base is relatively large (e.g., even when the length dimension of the swivel base is larger than the width dimension of the trolley). A greater degree of flexibility is thereby allowed for the size and the range of swiveling of the swivel base. Since the swivel driving mechanism on which the swivel base is mounted is installed on the bottom plate located at a lower position than the upper end of the trolley (the upper end of the vertical wall), it is possible to set the installation level of the swivel base to a lower level and thereby contribute to setting the load transfer position in the vertical direction to a lower position.

In the present disclosure, the swivel base is provided on the trolley so as to be able to swivel around the vertical axis, and the holding member (the holding member that holds a load) can be slid in the horizontal direction between the advanced position and the retracted position by the sliding mechanism capable of moving up and down along the pillar erected on the swivel base. Thus, it is possible to realize a configuration in which a load is loaded (received) in one direction and unloaded in another direction by means of the swiveling swivel base, without employing a configuration in which a plurality of members is supported so as to be able to swivel around different vertical axes. There is therefore no member (member supported so as to be able to swivel around the vertical axis) that constitutes an obstacle to lowering the lowest position to which the sliding mechanism can be moved along the pillar. As a result, the movable range of the sliding mechanism in the vertical direction (the movable range of the holding member in the vertical direction) is not significantly limited, and the load transfer position in the vertical direction can be set to a lower position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below based on the drawings. In this embodiment, a case will be described where the present disclosure is applied to a carrying apparatus used in an automobile production plant to carry an empty-box skid (a "load" as termed in the present disclosure) that is a pallet having placed thereon a plurality of empty boxes (empty parts boxes) from which parts have been taken out (parts have been fed to a production line), from a transportation trolley to an empty-box skid chute at an empty-box return station. In the following description, an action of picking up an empty-box skid on a transportation trolley by the carrying apparatus will be referred to as an empty-box skid receiving action, and an action of placing an empty-box skid from the carrying apparatus onto an empty-box skid chute will be referred to as an empty-box skid unloading action.

Carrying Apparatus

Figure 1:
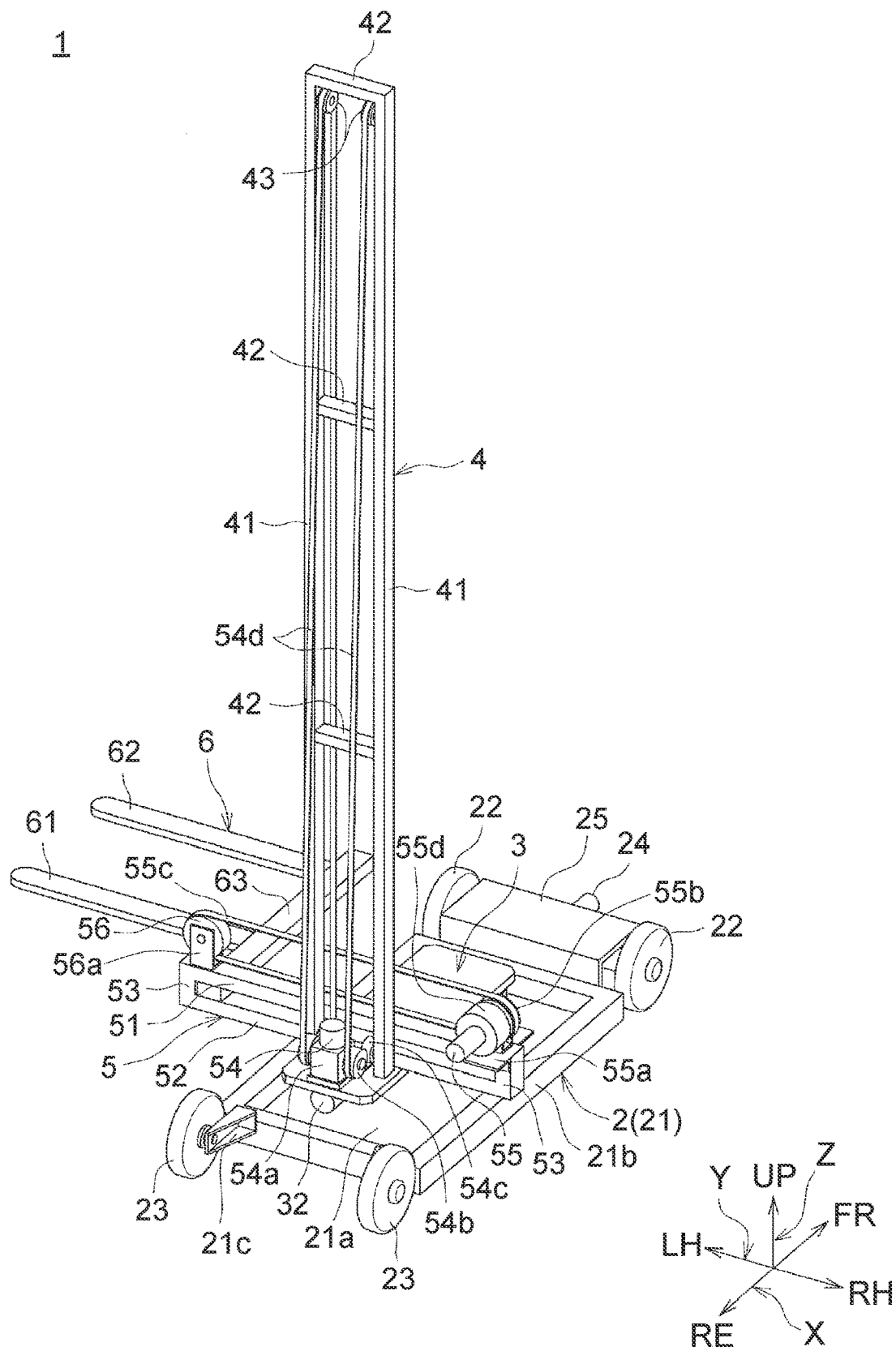
FIG. 1 is a perspective view of a carrying apparatus according to an embodiment.
Figure 2:
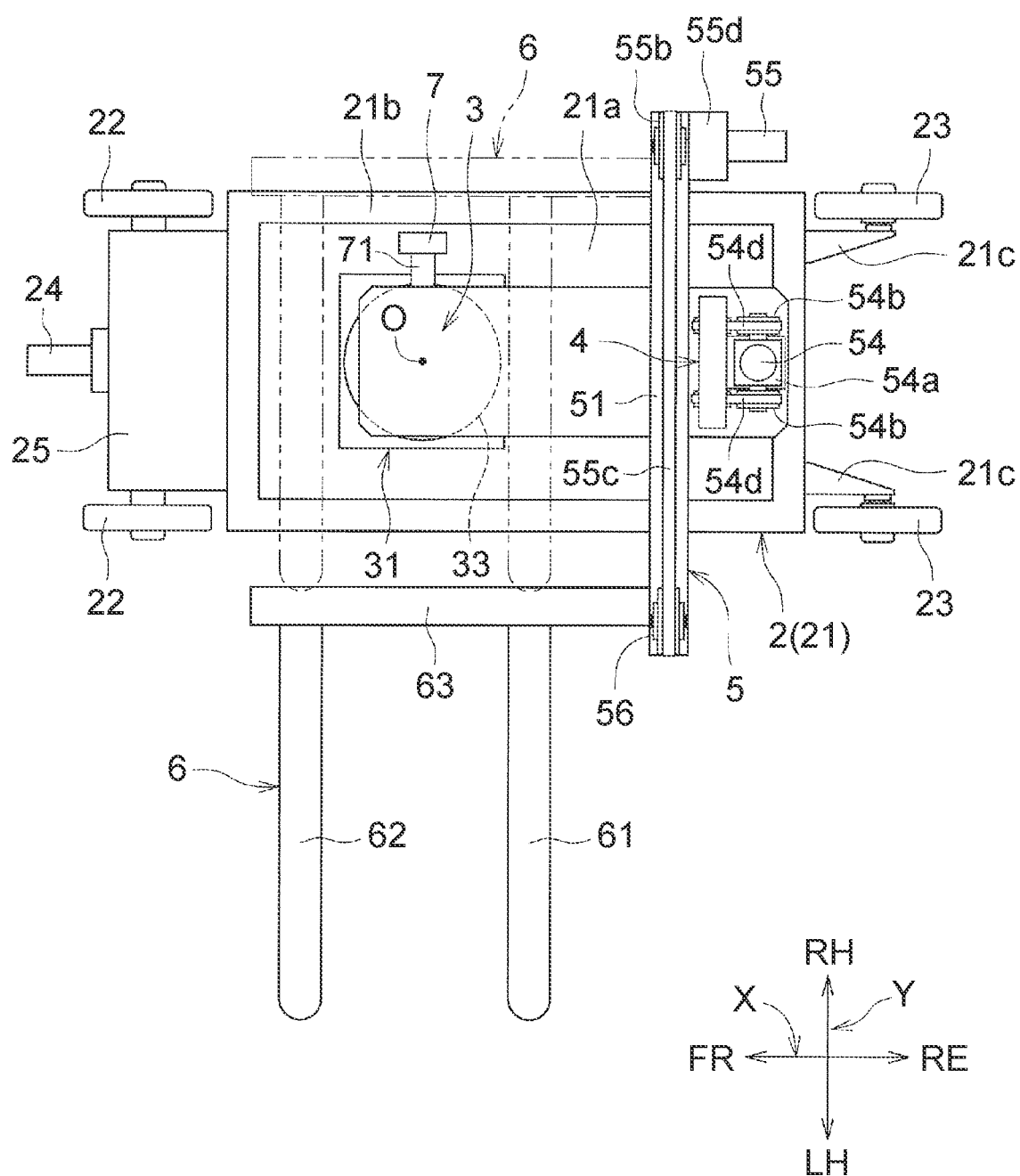
FIG. 2 is a plan view of the carrying apparatus according to the embodiment.

FIG. 1 is a perspective view of a carrying apparatus 1 according to the embodiment. FIG. 2 is a plan view of the carrying apparatus 1 according to the embodiment. Here, for convenience, the far side in FIG. 1 and the left side in FIG. 2 will be referred to as a front side of the carrying apparatus 1, and the near side in FIG. 1 and the right side in FIG. 2 will be referred to as a rear side of the carrying apparatus 1. Accordingly, the arrows FR, RE, UP, RH, and LH in these drawings indicate a frontward direction, a rearward direction, an upward direction, a rightward direction, and a leftward direction, respectively. Hereinafter, a front-rear direction, a width direction (right-left direction), and an up-down direction of the carrying apparatus 1 may also be referred to as an X-axis direction, a Y-axis direction, and a Z-axis direction, respectively.

As shown in FIG. 1 and FIG. 2, the carrying apparatus 1 includes a trolley 2, a swivel base 3, a swivel driving mechanism 31, a pillar 4, a sliding mechanism 5, and a fork (a "holding member" as termed in the present disclosure) 6.

Trolley

The trolley 2 is a member by which the carrying apparatus 1 travels and which supports the swivel base 3, the pillar 4, the sliding mechanism 5, and the fork 6. The trolley 2 includes a trolley main body 21, four wheels 22, 22, 23, 23, and a traveling motor (formed by an electric motor) 24.

The trolley main body 21 has a rectangular shape as seen in a plan view, and has a bottom plate 21a and vertical walls 21b, 21b, . . . extending vertically upward from outer edges of the bottom plate 21a, and a space to house the swivel driving mechanism 31, to be described later, that swivels the swivel base 3 is provided on an inside of the vertical walls 21b, 21b, . . . .

A travel power source support bracket 25 extending in a horizontal direction toward the front side is mounted on a front end surface of the trolley main body 21. The traveling motor 24 serving as a travel power source is supported on a lower surface of the travel power source support bracket 25. The traveling motor 24 includes a driving shaft (output shaft) extending along the front-rear direction of the carrying apparatus 1 (X-axis direction). The wheels 22, 22 serving as driving wheels are provided respectively on right and left sides of the travel power source support bracket 25 (on both sides in the Y-axis direction). The wheels 22, 22 rotate by receiving power from the traveling motor 24. Specifically, a power transmission mechanism (not shown) that transmits power from the traveling motor 24 to the wheels 22, 22 is mounted on the travel power source support bracket 25. The power transmission mechanism includes a gear mechanism that changes a rotation direction of rotating power output from the traveling motor 24 (converts rotation around the X-axis into rotation around the Y-axis), a speed reducer that reduces the rotation speed, etc.

The wheels 23, 23 serving as driven wheels are supported so as to be rotatable around a horizontal axis (Y-axis) by brackets 21c, 21c mounted on a rear end surface of the trolley main body 21.

Swivel Base

The swivel base 3 is formed by a substantially rectangular plate member that is smaller than the bottom plate 21a of the trolley main body 21, and is mounted so as to be able to rotate (swivel) around a vertical axis (Z-axis) on an upper side of the swivel driving mechanism 31 that is provided at a center part of the bottom plate 21a of the trolley main body 21. The dimension of the swivel base 3 in a longitudinal direction (the dimension in the X-axis direction in the state shown in FIG. 1 and FIG. 2; the state of the swivel base 3 shown in FIG. 1 and FIG. 2 will be referred to as an initial swiveling position of the swivel base 3) is smaller than the dimension of the trolley main body 21 in a longitudinal direction (the dimension in the X-axis direction). The dimension of the swivel base 3 in the longitudinal direction is larger than the dimension of the trolley main body 21 in the width direction (the dimension in the Y-axis direction). However, the swivel base 3 at the initial swiveling position is disposed such that the longitudinal direction thereof coincides with the longitudinal direction of the trolley main body 21, and not with the width direction of the trolley main body 21, which makes the configuration of the carrying apparatus 1 compact.

A fork pocket detection sensor 7 is mounted on the swivel base 3 through a bracket 71. The fork pocket detection sensor 7 is a sensor, such as a laser sensor, that detects a fork pocket FP of a pallet P of an empty-box skid S (see FIG. 4) to be described later. Specifically, the fork pocket detection sensor 7 detects the position of the fork pocket FP, for example, by emitting a laser beam along the width direction of the carrying apparatus 1 (Y-axis direction) (emitting a laser beam toward the pallet P so as to pass through the upper side of the trolley main body 21) in a state where the swivel base 3 is at the initial swiveling position, and then detecting light reflecting off a side surface of the pallet P of the empty-box skid S. The mounting position of the fork pocket detection sensor 7 is not limited to the swivel base 3 but may also be on the trolley main body 21.

The swivel driving mechanism 31 includes a sprocket 33 supported on the bottom plate 21a so as to be rotatable around the vertical axis (Z-axis), and the swivel base 3 is mounted on an upper surface of the sprocket 33 by means of bolt fastening etc. so as to be able to rotate integrally. The swivel driving mechanism 31 includes a swiveling motor 32. The swiveling motor 32 is provided at a rearward position on the bottom plate 21a of the trolley main body 21, and serves as a swivel power source for the swivel base 3. The swiveling motor 32 includes a driving shaft (output shaft) extending along the front-rear direction of the carrying apparatus 1 (X-axis direction). The sprocket 33 rotates by receiving power from the swiveling motor 32. As the sprocket 33 rotates, the swivel base 3 rotates around the vertical axis (Z-axis). Specifically, a power transmission mechanism (not shown) that transmits power from the swiveling motor 32 to the sprocket 33 is provided between the swiveling motor 32 and the sprocket 33. This power transmission mechanism includes a gear mechanism that changes a rotation direction of rotating power output from the swiveling motor 32 (converts rotation around the X-axis into rotation around the Z-axis), a speed reducer that reduces the rotation speed, etc. A chain is suspended between a sprocket (driving-side sprocket; not shown) coupled to this speed reducer and the sprocket (driven-side sprocket) 33, and rotating power output from the swiveling motor 32 is transmitted to the driven-side sprocket 33 through the power transmission mechanism, allowing the swivel base 3 to rotate around the vertical axis (Z-axis).

The level of the swivel base 3 is set such that the level of a lower surface of the swivel base 3 is slightly higher than the level of an upper end of the vertical wall 21b of the trolley main body 21. In other words, the swivel driving mechanism 31 is provided on the bottom plate 21a such that the level of the upper surface of the sprocket 33 on which the swivel base 3 is mounted is slightly higher than the level of the upper end of the vertical wall 21b of the trolley main body 21. Thus, when the swivel base 3 rotates around the vertical axis, the swivel base 3 does not interfere with the trolley main body 21 (the vertical wall 21b of the trolley main body 21). To set the installation level of the swivel base 3 to as low a level as possible, it is preferable that the interval between the level of the lower surface of the swivel base 3 and the level of the upper end of the vertical wall 21b of the trolley main body 21 be small.

Pillar

The pillar 4 is erected at a rearward position on the swivel base 3 (a rearward position with the swivel base 3 at the initial swiveling position shown in FIG. 1), and extends in the vertical direction. Specifically, the pillar 4 is erected at a rearward position (a position offset toward the rear side) from a center of swiveling O around which the swivel base 3 is swiveled by the swivel driving mechanism 31 (the center of rotation of the driven-side sprocket 33). The pillar 4 includes a pair of right and left pillar members 41, 41 extending in the vertical direction, and a plurality of coupling members 42, 42, . . . provided at positions at predetermined intervals in the vertical direction so as to couple together the pillar members 41, 41.

The height dimension of the pillar 4 is set such that the position of an upper end of the pillar 4 is equivalent to a transfer level in the vertical direction of an empty-box skid S that is located farthest on the upper side when empty-box skids S are piled up by the carrying apparatus 1 (e.g., when empty-box skids S, S, . . . are piled up in tiers on an empty-box skid conveyor SC of an empty-box skid chute SS to be described later).

Sliding Mechanism and Fork

The sliding mechanism 5 is capable of moving up and down along the extension direction of the pillar 4, and slides the fork 6 in a horizontal direction between an advanced position (the position indicated by solid lines in FIG. 2) at which the empty-box skid S is handed over (received and unloaded) and a retracted position (the position indicated by imaginary lines in FIG. 2) at which the empty-box skid S is located above the swivel base 3 in a state where the fork 6 holds the empty-box skid S.

Specifically, the sliding mechanism 5 includes guide members 51, 52 that guide the sliding of the fork 6. These guide members are an upper guide member 51 and a lower guide member 52 that are provided parallel to each other (parallel along the Y-axis direction) with a predetermined interval left in the vertical direction. The upper guide member 51 and the lower guide member 52 are coupled together at both ends in a longitudinal direction by coupling members 53, 53. Thus, there is a predetermined interval in the vertical direction between the upper guide member 51 and the lower guide member 52 that corresponds to the height dimension of the coupling member 53. The guide members 51, 52 extend toward one side and the other side of the pillar 4 in the horizontal direction (Y-axis direction). Specifically, on one side in the longitudinal direction (Y-axis direction), the guide members 51, 52 extend over a predetermined dimension in the leftward direction (the leftward direction in FIG. 1), and have leading ends located on the left side of a left-side edge of the trolley 2 as seen in a plan view. Similarly, on the other side in the longitudinal direction (Y-axis direction), the guide members 51, 52 extend over a predetermined dimension in the rightward direction (the rightward direction in FIG. 1), and have leading ends located on the right side of a right-side edge of the trolley 2 as seen in a plan view.

The fork 6 includes a pair of prongs 61, 62 extending along the Y-axis direction, and a coupling part 63 extending in the front-rear direction (X-axis direction) so as to couple together base ends of the prongs 61, 62. With a rear end portion of the coupling part 63 engaged with the upper guide member 51 and the lower guide member 52, the fork 6 is slidable in the horizontal direction.

An elevating motor 54 is provided on the swivel base 3, near a lower end of the pillar 4. The elevating motor 54 includes a driving shaft (output shaft) extending along the up-down direction (Z-axis direction). The driving shaft of the elevating motor 54 is connected to a power transmission mechanism 54a installed on the swivel base 3. The power transmission mechanism 54a includes a gear mechanism that changes a rotation direction of rotating power output from the elevating motor 54 (converts rotation around the Z-axis into rotation around the Y-axis), a speed reducer that reduces the rotation speed, etc. An output shaft (not shown) of the power transmission mechanism 54a extends toward both sides in the Y-axis direction, and pulleys 54b, 54b are mounted on both sides of this output shaft. On the other hand, pulleys 54c, 54c, 43, 43 rotatable around axes in the width direction of the carrying apparatus 1 (Y-axis direction) are provided respectively on lower ends and upper ends of the pillar members 41, 41 of the pillar 4. A belt 54d is wound around the pulleys 54b, 54c, 43. Thus, when the elevating motor 54 is activated to rotate the pulleys 54b, 54b mounted on the output shaft of the power transmission mechanism 54a, the resulting rotating power causes the belt 54d to travel across the pulleys 54b, 54c, 43. The guide members 51, 52 of the sliding mechanism 5 are coupled to the belts 54d, 54d in a span between the pulleys 54c, 43, and the sliding mechanism 5 moves up and down along the extension direction of the pillar 4 as the belts 54d, 54d travel. Therefore, the elevation position of the sliding mechanism 5 can be controlled by adjusting the amount of rotation of the elevating motor 54. Since the fork 6 is engaged with the upper guide member 51 and the lower guide member 52 as described above, the fork 6 also moves up and down as the sliding mechanism 5 moves up and down, and therefore the elevation position of the fork 6 can be controlled by controlling the elevation position of the sliding mechanism 5.

A sliding motor 55 is supported through a bracket 55a on a right-side end of an upper surface of the upper guide member 51. The sliding motor 55 includes a driving shaft (output shaft) extending along the front-rear direction (X-axis direction) of the swivel base 3 at the initial swiveling position. A speed reducer 55d is connected to the driving shaft of the sliding motor 55. A pulley 55b is mounted on an output shaft of the speed reducer 55d. On the other hand, a pulley 56 rotatable around an axis in the front-rear direction (X-axis direction) of the swivel base 3 at the initial swiveling position is supported through a bracket 56a on a left-side end of the upper surface of the upper guide member 51. A belt 55c is wound around the pulley (driving-side pulley) 55b coupled to the sliding motor 55 and the pulley (driven-side pulley) 56 provided at the left-side end of the upper surface of the upper guide member 51. Thus, when the sliding motor 55 is activated to rotate the driving-side pulley 55b, the resulting rotating power causes the belt 55c to travel across the driving-side pulley 55b and the driven-side pulley 56. The coupling part 63 of the fork 6 is coupled to the belt 55c, and the fork 6 slides along the extension direction of the guide members 51, 52 (horizontal direction) as the belt 55c travels. Therefore, the sliding position of the fork 6 can be controlled by adjusting the amount of rotation of the sliding motor 55. The fork 6 can be thereby slid in the horizontal direction between the advanced position (the position indicated by solid lines in FIG. 2) at which the empty-box skid S is handed over (received and unloaded) and the retracted position (the position indicated by imaginary lines in FIG. 2) at which the empty-box skid S is located above the swivel base 3 in a state where the fork 6 holds the empty-box skid S. When the fork 6 is at the retracted position, the prongs 61, 62 of the fork 6 are located one on each side of the center of swiveling O of the swivel base 3 (on each side in a direction along the X-axis direction) as seen in a plan view. Thus, at the retracted position, the empty-box skid S held by the fork 6 is located above the center of swiveling O of the swivel base 3. In other words, the empty-box skid S is held by the fork 6 in a state where the position of the center of gravity of the empty-box skid S and the center of swiveling O of the swivel base 3 are close to each other.

Control Block

Figure 3:
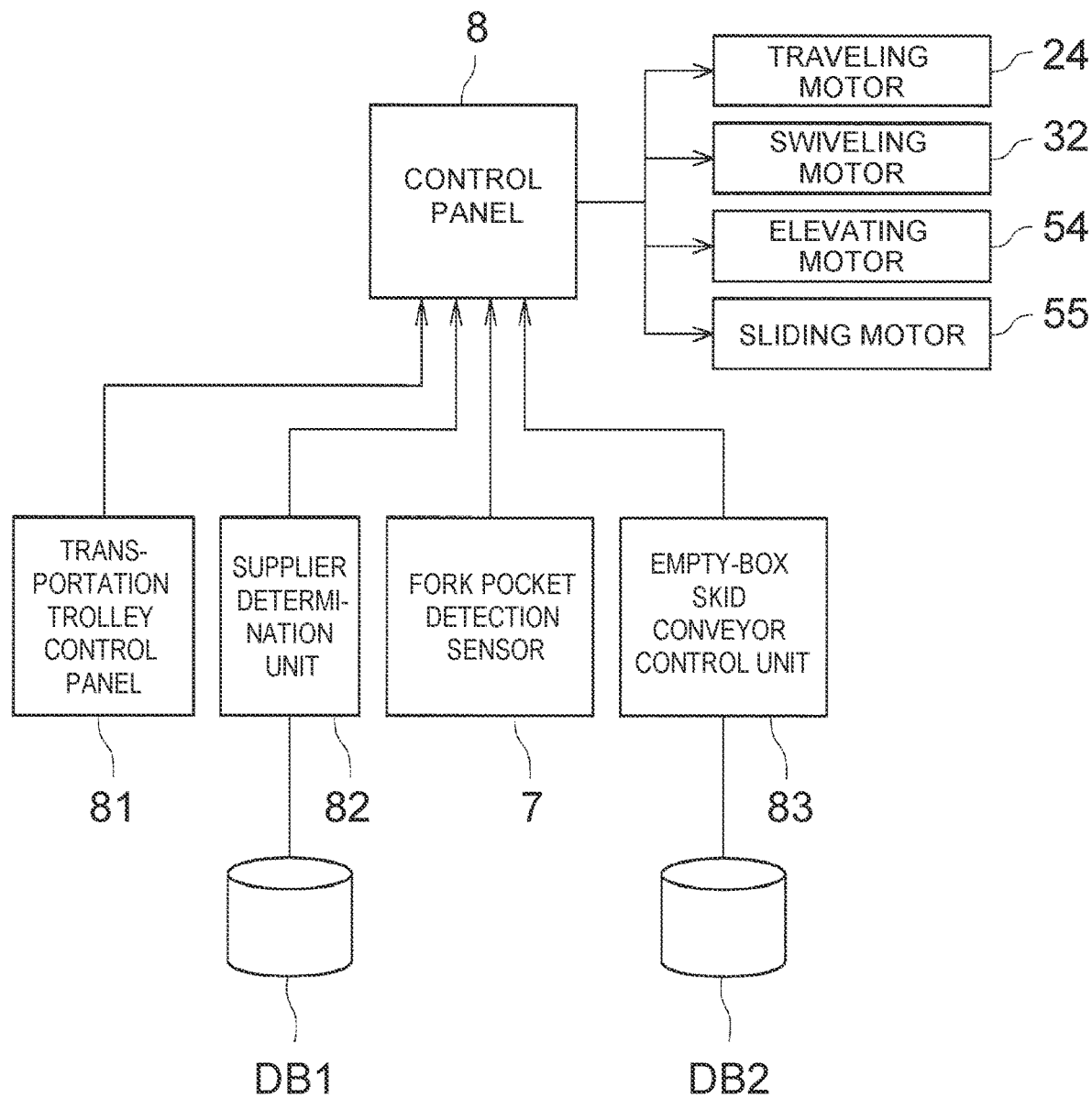
FIG. 3 is a block diagram showing the configuration of a control system of the carrying apparatus according to the embodiment.

FIG. 3 is a block diagram showing the configuration of a control system of the carrying apparatus 1 according to the embodiment. As shown in FIG. 3, the control system of the carrying apparatus 1 includes a control panel 8. Although this is not shown, the control panel 8 includes a commonly known central processing unit (CPU), a read-only memory (ROM), a random-access memory (RAM), and others.

The ROM stores a control program etc. used to control the carrying apparatus 1 to carry the empty-box skid S. The CPU executes a computation process based on the control program stored in the ROM. The RAM is a memory that temporarily stores a computation result of the CPU etc.

Alternatively, the carrying apparatus 1 may be controlled by a command from a control unit provided outside the carrying apparatus 1. The control unit in the present disclosure may be the control panel 8 or a control unit provided outside the carrying apparatus 1.

The control panel 8 is connected to the fork pocket detection sensor 7, a transportation trolley control panel 81, a supplier determination unit 82, and an empty-box skid conveyor control unit 83, and information from these are input into the control panel 8.

As described above, the fork pocket detection sensor 7 detects the position of the fork pocket FP, for example, by emitting a laser beam toward the pallet P of the empty-box skid S and detecting light reflecting off a side surface of the pallet P. A detection signal output from the fork pocket detection sensor 7 is input into the control panel 8, and the control panel 8 thereby recognizes the position of the fork pocket FP of the pallet P.

Figure 5:
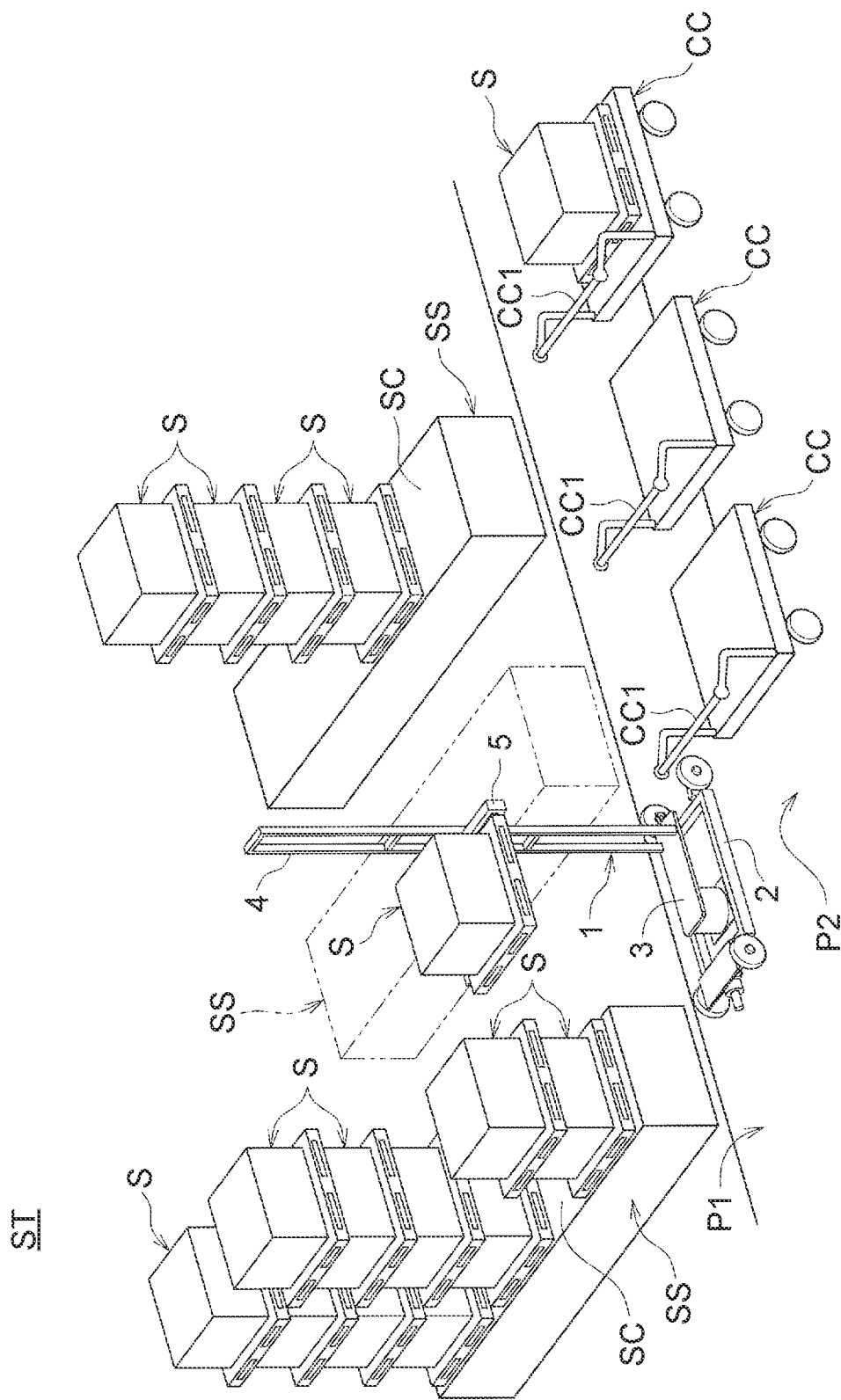
FIG. 5 is a view showing an empty-box return station inside an automobile production plant.

The transportation trolley control panel 81 controls traveling and stopping of the transportation trolley CC (see FIG. 5 that shows the empty-box return station ST inside the automobile production plant) when the transportation trolley CC with the empty-box skid S placed thereon travels toward the empty-box return station ST. Specifically, the transportation trolley CC is moved to the empty-box return station ST by being towed by a tow vehicle (not shown). As control of traveling and stopping of the transportation trolley CC towed by a tow vehicle is publicly known, the description thereof will be omitted here. An output signal from the transportation trolley control panel 81 is input into the control panel 8, and the control panel 8 thereby recognizes the stopping position of the transportation trolley CC. More specifically, in this embodiment, a plurality of transportation trolleys CC, CC, . . . is coupled to one another and moved to the empty-box return station ST as shown in FIG. 5. Accordingly, the output signal from the transportation trolley control panel 81 includes information on stopping positions of the respective transportation trolleys CC, CC, . . . .

The supplier determination unit 82 acquires information on a return destination of the empty-box skid S placed on the transportation trolley CC, i.e., the supplier of parts having been contained in parts boxes B, B, . . . of the empty-box skid S (parts having been fed to a production line). For example, the supplier determination unit 82 determines the supplier by recognizing a label etc. displayed on or attached to a side surface of the pallet P or side surfaces of the parts boxes B, B, . . . of the empty-box skid S (by taking images and performing image recognition). The supplier determination unit 82 is connected to a database DB1 that stores information in which information on suppliers is associated with the empty-box skid chutes SS installed at the empty-box return station ST. By referring to the information stored in the database DB1, the supplier determination unit 82 specifies the empty-box skid chute SS from the information on the supplier, and sends the acquired information to the control panel 8. An output signal from the supplier determination unit 82 is input into the control panel 8, and the control panel 8 thereby ascertains the separate return destinations (the empty-box skid chutes SS as return destinations) of the empty-box skids S, S, . . . placed on the respective transportation trolleys CC, CC, . . . . The supplier determination unit 82 may be installed at the empty-box return station ST, or may be configured to acquire information on the return destinations of the empty-box skids S, S, . . . at a stage before the transportation trolleys CC, CC, . . . are moved to the empty-box return station ST.

The empty-box skid conveyor control unit 83 controls the empty-box skid conveyor SC of the empty-box skid chute SS installed at the empty-box return station ST. Specifically, the empty-box skid conveyor SC is controlled as follows: When the upper limit of the number of tiers of the empty-box skids S placed on the empty-box skid conveyor SC is four, the empty-box skid conveyor SC is activated when four tiers of empty-box skids S are placed on the empty-box skid conveyor SC, to convey these four tiers of empty-box skids S, S, . . . toward an unloading side (e.g., a side where a freight truck is on standby). The empty-box skid conveyor control unit 83 is connected to a database DB2 that stores setting information on the upper limit of the number of tiers of the empty-box skids S placed on the empty-box skid conveyor SC. By referring to the information stored in the database DB2, the empty-box skid conveyor control unit 83 sends to the control panel 8 the setting information on the upper limit of the number of tiers of the empty-box skids S placed on the empty-box skid conveyor SC. The control panel 8 receives an output signal from the empty-box skid conveyor control unit 83, and thereby ascertains the current number of tiers of the empty-box skids S placed on the empty-box skid conveyor SC and the upper limit of the number of tiers of the empty-box skids S placed on the empty-box skid conveyor SC. The control panel 8 controls the loading height at which the empty-box skid S is placed on the empty-box skid conveyor SC (the loading height of the empty-box skid S that is determined by moving up and down the sliding mechanism 5) accordingly.

The control panel 8 is connected to each of the traveling motor 24, the swiveling motor 32, the elevating motor 54, and the sliding motor 55, and controls the traveling action of the carrying apparatus 1, the swiveling action of the swivel base 3, the up-and-down moving action of the sliding mechanism 5, and the sliding action of the fork 6 by outputting control signals to these motors 24, 32, 54, 55.

Empty-Box Skid

Figure 4:
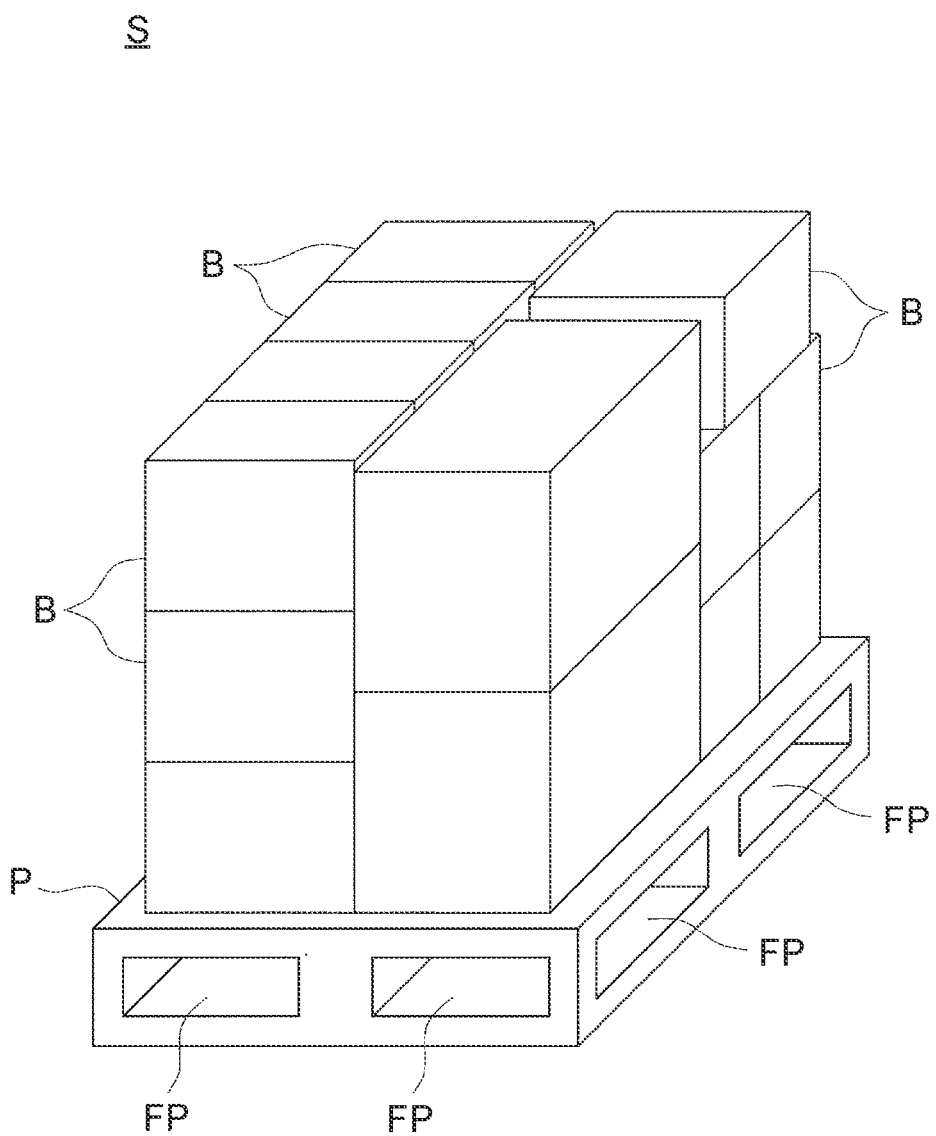
FIG. 4 is a view showing an example of an empty-box skid.

FIG. 4 is a view showing an example of the empty-box skid S to be carried by the carrying apparatus 1. As shown in FIG. 4, the empty-box skid S has the form of the pallet P with a plurality of empty boxes (empty parts boxes) B, B, . . . placed thereon. In this embodiment, the fork pockets FP, FP are provided in side surfaces of the pallet P, and the empty-box skid S can be lifted (held) and carried with the prongs 61, 62 of the fork 6 respectively inserted into the fork pockets FP, FP.

Although this is not shown, information on a parts manufacturer that is the supplier of the part having been contained in the empty box B is displayed on a side surface of the pallet P. For example, the name of the parts manufacturer, or a two-dimensional code etc. for identifying the parts manufacturer is displayed. The supplier determination unit 82 determines the supplier by reading the displayed information.

Empty-Box Return Station

Next, the empty-box return station ST at which the carrying apparatus 1 configured as has been described above is used will be described. As described above, the carrying apparatus 1 is used to carry the empty-box skid S from the transportation trolley CC to the empty-box skid chute SS at the empty-box return station ST.

As shown in FIG. 5, a plurality of empty-box skid chutes SS, SS, . . . installed for the respective parts manufacturers are provided at the empty-box return station ST. (In FIG. 5, one of the empty-box skid chutes SS is indicated by imaginary lines.) Each empty-box skid chute SS includes the empty-box skid conveyor SC that conveys the empty-box skids S, S, . . . . At the empty-box return station ST, a carrying apparatus path P1 is provided on a side closer to the empty-box skid chute SS along the direction in which the empty-box skid chutes SS, SS, . . . are provided, and a transportation trolley path P2 is provided on a side farther away from the empty-box skid chute SS, adjacent to the carrying apparatus path P1. Thus, while traveling along the carrying apparatus path P1, the carrying apparatus 1 receives the empty-box skid S from a predetermined transportation trolley CC among the transportation trolleys CC, CC, . . . having traveled along the transportation trolley path P2, and carries this empty-box skid S onto the empty-box skid conveyor SC of a predetermined empty-box skid chute SS.

In this embodiment, the transportation trolleys CC, CC, . . . coupled to one another are moved to the empty-box return station ST by being towed by the tow vehicle (not shown) as described above. The transportation trolley CC is provided with a handle CC1 that allows a worker to move the transportation trolley CC.

Empty-Box Skid Carrying Operation

Next, an operation of carrying the empty-box skid S at the empty-box return station ST, i.e., an operation in which the carrying apparatus 1 receives the empty-box skid S from the transportation trolley CC and places the empty-box skid S on a predetermined empty-box skid chute SS, will be described.

In this carrying operation of the empty-box skid S, an empty-box skid receiving action of picking up the empty-box skid S on the transportation trolley CC by the carrying apparatus 1, a traveling action of the carrying apparatus 1, and an empty-box skid unloading action of placing the empty-box skid S from the carrying apparatus 1 onto the empty-box skid chute SS, are sequentially performed. These actions will be sequentially described below.

Empty-Box Skid Receiving Action

In the empty-box skid receiving action, first, the return destinations of the empty-box skids S, S, . . . placed on the respective transportation trolleys CC, CC, . . . to be moved to the empty-box return station ST by being towed by the tow vehicle, i.e., the empty-box skid chutes SS, SS, . . . onto which the empty-box skids S, S, . . . should be respectively unloaded, are determined (the suppliers of the parts are determined) by the supplier determination unit 82. Specifically, the supplier determination unit 82 determines the supplier by recognizing a label etc. displayed on or attached to a side surface of the pallet P or side surfaces of the parts boxes B, B, . . . of the empty-box skid S, and by referring to the information stored in the database DB1, acquires information in which the information on the determined supplier is associated with the empty-box skid chute SS, and sends the acquired information to the control panel 8 of the carrying apparatus 1. The control panel 8 thereby ascertains the separate return destinations (the empty-box skid chutes SS as return destinations) of the empty-box skids S, S, . . . placed on the respective transportation trolleys CC, CC, . . . .

Figure 6A:
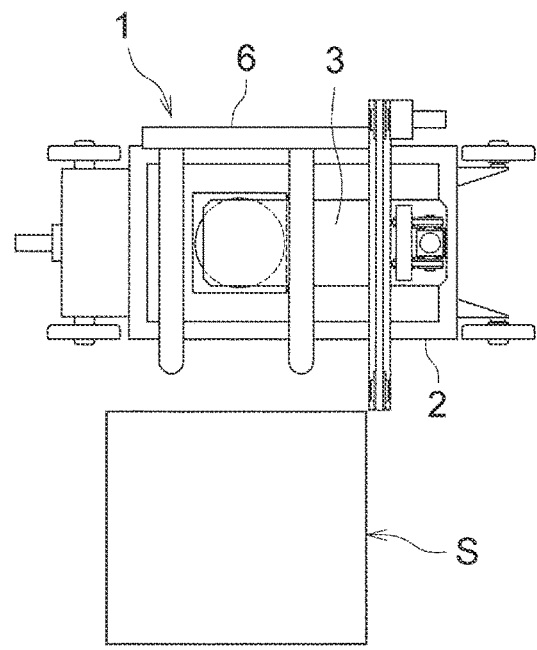
FIG. 6A is a plan view showing a state where the carrying apparatus has traveled to a position at which the carrying apparatus faces the empty-box skid during an empty-box skid receiving action of the carrying apparatus.
Figure 6B:
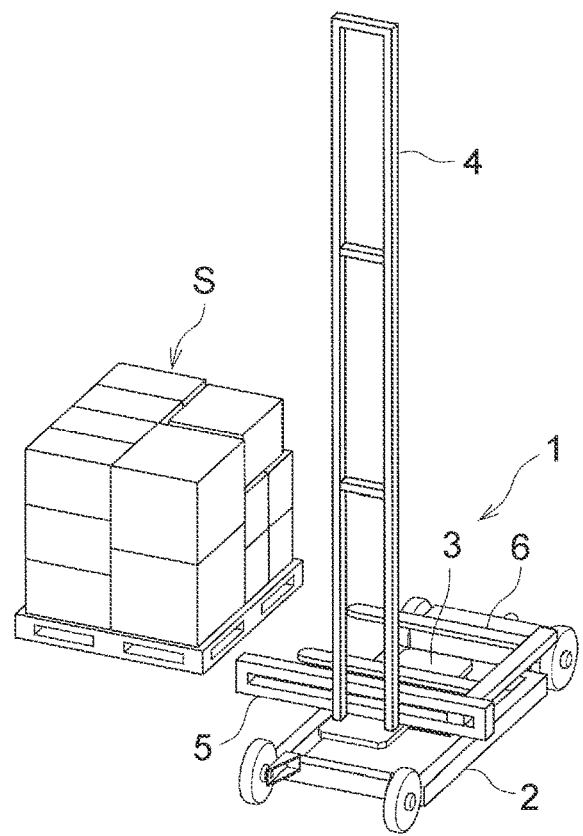
FIG. 6B is a perspective view showing the state where the carrying apparatus has traveled to the position at which the carrying apparatus faces the empty-box skid during the empty-box skid receiving action of the carrying apparatus.

Then, the traveling motor 24 is activated to rotate the wheels 22, 22, 23, 23, and the carrying apparatus 1 travels to a position at which the carrying apparatus 1 faces the transportation trolley CC on which the empty-box skid S to be carried is placed. For example, the carrying apparatus 1 travels to the position at which the carrying apparatus 1 faces the second transportation trolley CC from the near side in FIG. 5. FIG. 5 shows a state where the empty-box skid S is being carried by the carrying apparatus 1. FIG. 6A and FIG. 6B are schematic views showing a state where the carrying apparatus 1 has traveled to the position at which the carrying apparatus 1 faces the empty-box skid S during the empty-box skid receiving action of the carrying apparatus 1. FIG. 6A is a plan view and FIG. 6B is a perspective view. (In FIG. 6A and FIG. 6B, the transportation trolley CC is not shown.)

After the carrying apparatus 1 thus travels to the position at which the carrying apparatus 1 faces the transportation trolley CC on which the empty-box skid S is placed, the elevating motor 54 is activated to move the sliding mechanism 5 up or down along the extension direction of the pillar 4 and thereby move the fork 6 to a position at which the fork 6 faces the pallet P (a position at which the prongs 61, 62 of the fork 6 can be inserted into the fork pockets FP, FP).

The control to cause the carrying apparatus 1 to travel to the position at which the carrying apparatus 1 faces the transportation trolley CC and the control to move the fork 6 to the position at which the fork 6 faces the pallet P are performed by controlling each of the traveling motor 24 and the elevating motor 54 based on detection signals (detection signals of the position of the fork pocket FP) output from the fork pocket detection sensor 7. That is, the prongs 61, 62 of the fork 6 are controlled in each of the horizontal direction (X-axis direction) and the vertical direction (Z-axis direction) so as to face the fork pockets FP, FP, respectively.

Figure 7A:
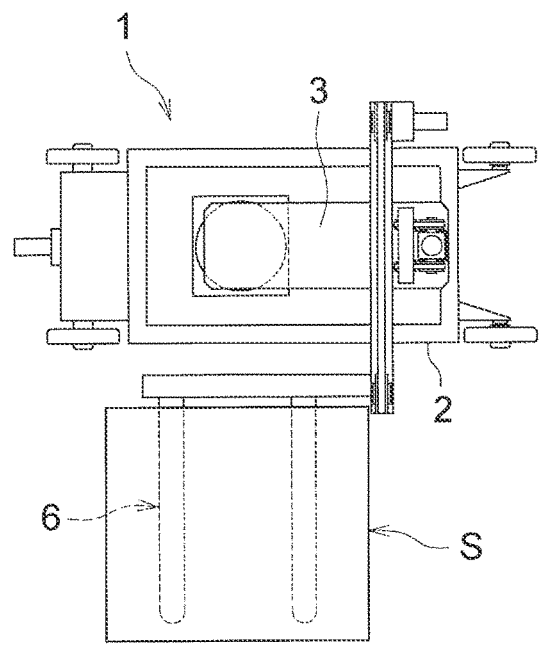
FIG. 7A is a plan view showing a state where a fork has slid to an advanced position during the empty-box skid receiving action of the carrying apparatus.
Figure 7B:
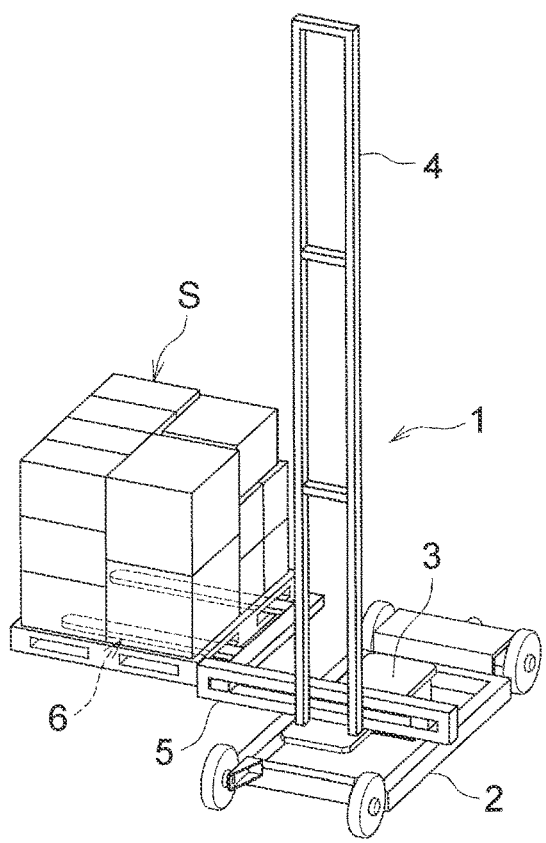
FIG. 7B is a perspective view showing the state where the fork has slid to the advanced position during the empty-box skid receiving action of the carrying apparatus.

Thereafter, the sliding motor 55 is activated to slide the fork 6 to the advanced position (the position at which the empty-box skid S is received; the position at which the prongs 61, 62 of the fork 6 are inserted into the fork pockets FP, FP) and thereby hold the empty-box skid S by the fork 6. (In reality, the elevating motor 54 is activated to slightly move up the fork 6 so as to lift and hold the empty-box skid S.) FIG. 7A and FIG. 7B are schematic views showing a state where the fork 6 has slid to the advanced position during the empty-box skid receiving action of the carrying apparatus 1. FIG. 7A is a plan view and FIG. 7B is a perspective view. (In FIG. 7A and FIG. 7B, the transportation trolley CC is not shown.)

Figure 8A:
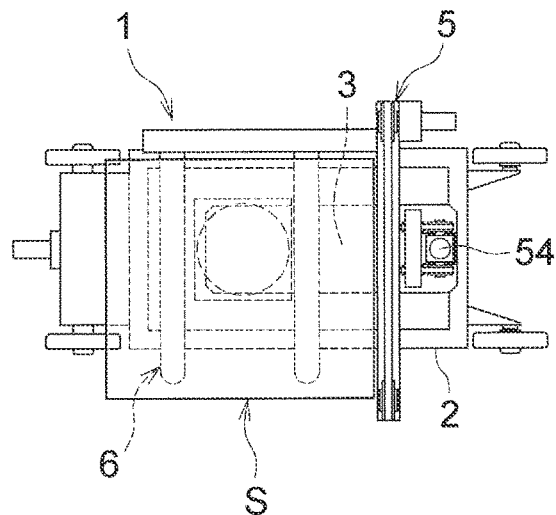
FIG. 8A is a plan view showing a state where the fork has slid to a retracted position and a sliding mechanism has moved up during the empty-box skid receiving action of the carrying apparatus.
Figure 8B:
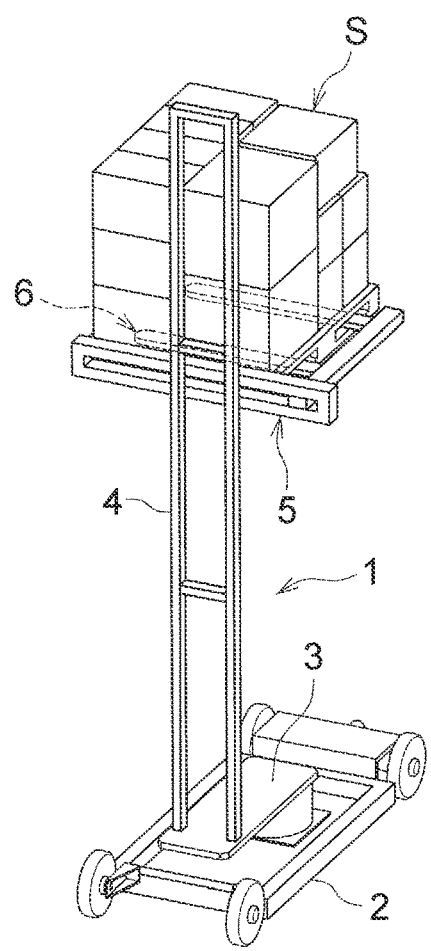
FIG. 8B is a perspective view showing the state where the fork has slid to the retracted position and the sliding mechanism has moved up during the empty-box skid receiving action of the carrying apparatus.

In the state where the fork 6 is thus holding the empty-box skid S, the sliding motor 55 is activated to slide the fork 6 to the retracted position (the position at which the empty-box skid S is located above the swivel base 3). Moreover, the elevating motor 54 is activated to move up the sliding mechanism 5 along the extension direction of the pillar 4 and also move up the empty-box skid S accordingly. FIG. 8A and FIG. 8B are schematic views showing a state where the fork 6 has slid to the retracted position and the sliding mechanism 5 has moved up during the empty-box skid receiving action of the carrying apparatus 1. FIG. 8A is a plan view and FIG. 8B is a perspective view. The elevating motor 54 is controlled here such that the empty-box skid S and the sliding mechanism 5 move up to such a level as not to interfere with the handle CC1 of the transportation trolley CC etc. Since the level of the handle CC1 is specified in advance, the position to which the sliding mechanism 5 is moved up is also specified in advance.

Traveling Action of Carrying Apparatus

In the traveling action of the carrying apparatus 1, the traveling motor 24 is activated to rotate the wheels 22, 22, 23, 23, and the carrying apparatus 1 travels to a position at which the carrying apparatus 1 faces the empty-box skid chute SS onto which the empty-box skid S held by the carrying apparatus 1 is to be unloaded. For example, the carrying apparatus 1 travels to the position at which the carrying apparatus 1 faces the empty-box skid chute SS located on the near side in FIG. 5.

Empty-Box Skid Unloading Action

In the empty-box skid unloading action, a swiveling action of the swivel base 3, an up-and-down moving action of the sliding mechanism 5, and a sliding action of the fork 6 are performed.

Figure 9A:
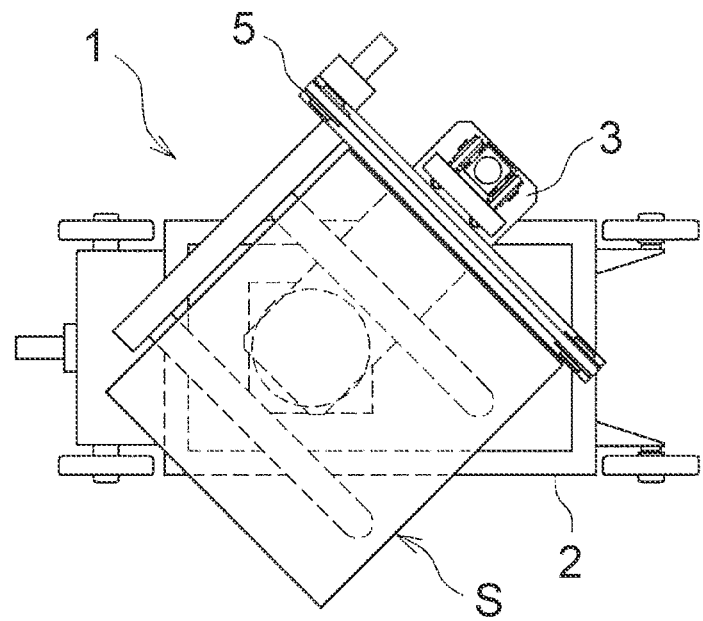
FIG. 9A is a plan view showing a state of the swivel base having swiveled 45°.
Figure 9B:
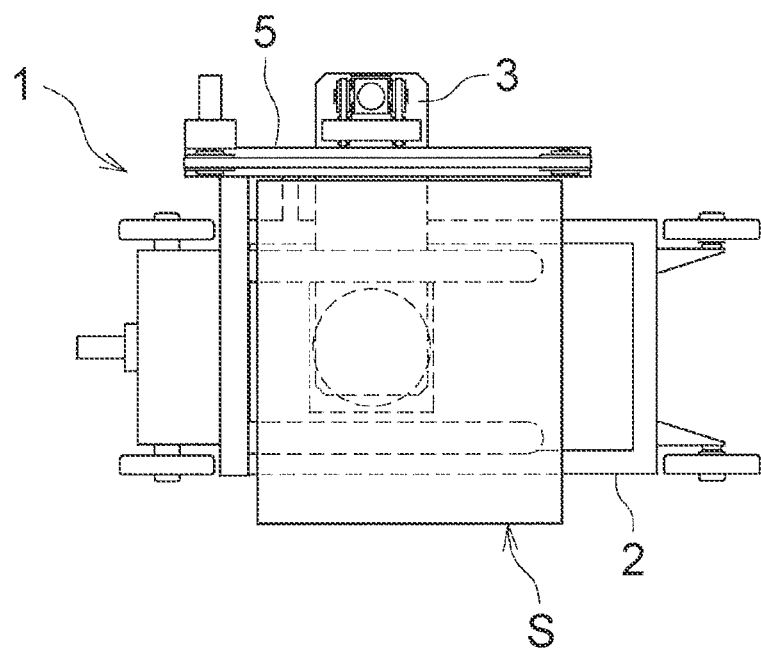
FIG. 9B is a plan view showing a state of the swivel base having swiveled 90°.
Figure 9C:
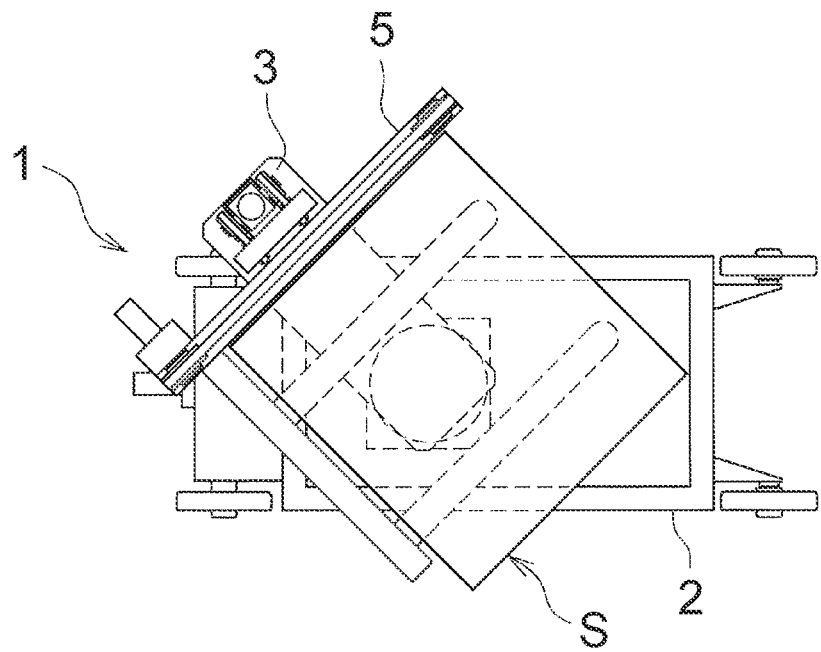
FIG. 9C is a plan view showing a state of the swivel base having swiveled 135°.
Figure 10A:
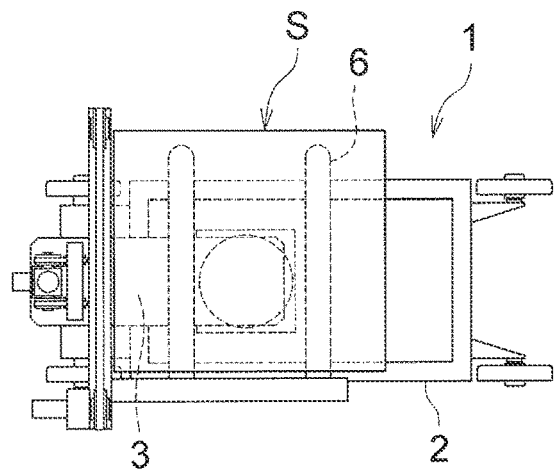
FIG. 10A is a plan view showing a state of the swivel base upon completion of swiveling.
Figure 10B:
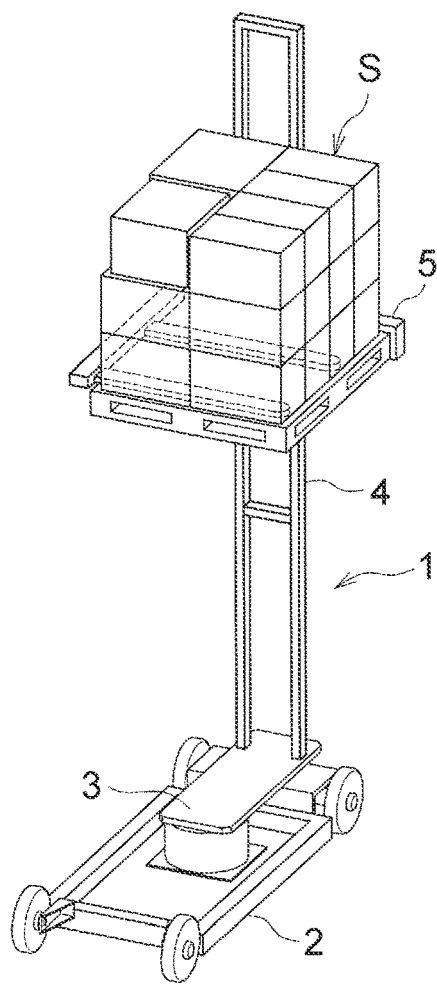
FIG. 10B is a perspective view showing the state of the swivel base upon completion of swiveling.

In the swiveling action of the swivel base 3, the swivel base 3 is swiveled 180° such that the empty-box skid S faces the empty-box skid chute SS. Specifically, the swiveling motor 32 is activated and rotating power output from the swiveling motor 32 is transmitted through the power transmission mechanism to the driven-side sprocket 33, and thereby the swivel base 3 is rotated around the vertical axis (Z-axis). FIG. 9A to FIG. 9C are plan views of the carrying apparatus illustrating the swiveling action of the swivel base 3. FIG. 9A to FIG. 9C show states of having swiveled 45°, 90°, and 135°, respectively. FIG. 10A and FIG. 10B are schematic views showing a state of the swivel base 3 upon completion of swiveling. FIG. 10A is a plan view and FIG. 10B is a perspective view.

In the up-and-down moving action of the sliding mechanism 5, it is ascertained how many tiers of the empty-box skids S are placed on the empty-box skid conveyor SC of the empty-box skid chute SS onto which the empty-box skid S is to be placed, and the elevation position of the sliding mechanism 5 is determined accordingly. Specifically, the control panel 8 receives an output signal from the empty-box skid conveyor control unit 83, and ascertains the current number of tiers of the empty-box skids S placed on the empty-box skid conveyor SC (e.g., the current number of tiers of the empty-box skids S placed on the empty-box skid chute SS located on the near side in FIG. 5). The elevating motor 54 is controlled to move up or down the sliding mechanism 5 such that the level of the lower surface of the empty-box skid S that is currently held matches the level of the upper surface of the empty-box skid conveyor SC, according to each of cases where there is no empty-box skid S on the empty-box skid conveyor SC, where there is one empty-box skid S placed on the empty-box skid conveyor SC, where the empty-box skids S, S are placed in two tiers on the empty-box skid conveyor SC, and where the empty-box skids S, S, . . . are placed in three tires on the empty-box skid conveyor SC (such that the level of the lower surface of the empty-box skid S that is currently held matches the level of the upper surface of the empty-box skid conveyor SC in the case where there is no empty-box skid S on the empty-box skid conveyor SC and matches the level of the upper surface of the empty-box skid S located in the top tier in the case where there are one or more empty-box skids S on the empty-box skid conveyor SC).

Figure 11A:
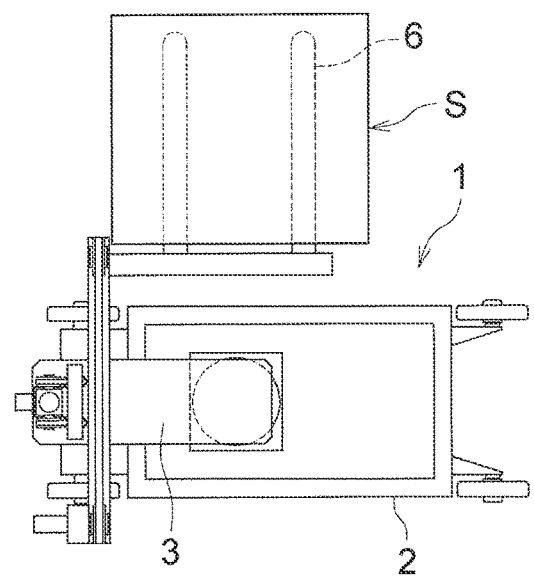
FIG. 11A is a plan view showing a state where the sliding mechanism has moved down and the fork has slid to the advanced position during an empty-box skid unloading action of the carrying apparatus.
Figure 11B:
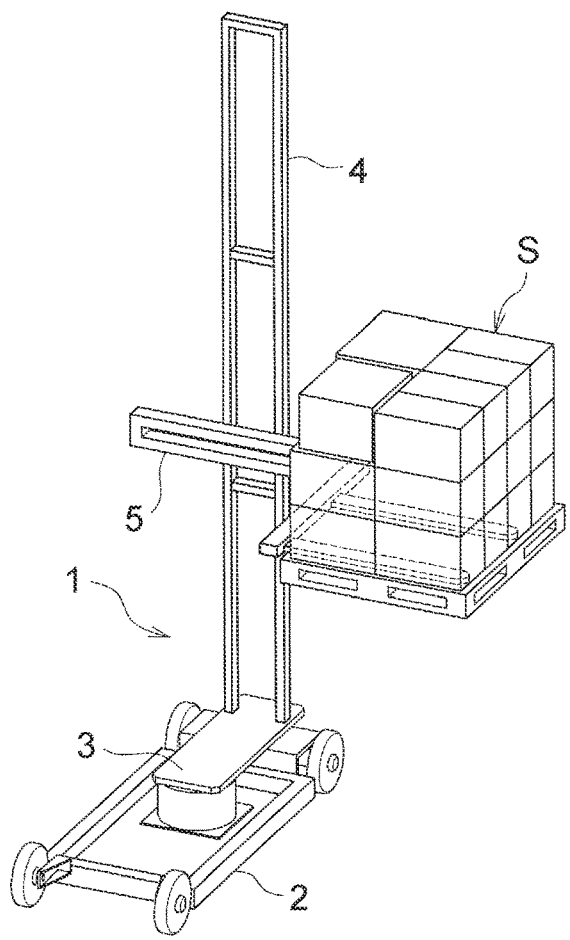
FIG. 11B is a perspective view showing the state where the sliding mechanism has moved down and the fork has slid to the advanced position during the empty-box skid unloading action of the carrying apparatus.

In the sliding action of the fork 6, the sliding motor 55 is activated to slide the fork 6 to the advanced position (the position at which the empty-box skid S is unloaded; the position at which the fork 6 is advanced to above the empty-box skid conveyor SC), and thereby the empty-box skid S is unloaded onto the empty-box skid conveyor SC. (In reality, the elevating motor 54 is activated to slightly move down the fork 6 so as to place the empty-box skid S onto the empty-box skid conveyor SC.) FIG. 11A and FIG. 11B are schematic views showing a state where the sliding mechanism 5 has moved down to a predetermined position and the fork 6 has slid to the advanced position during the empty-box skid unloading action of the carrying apparatus 1. FIG. 11A is a plan view and FIG. 11B is a perspective view. (In FIG. 11A and FIG. 11B, the empty-box skid chute SS is not shown.)

Figure 12A:
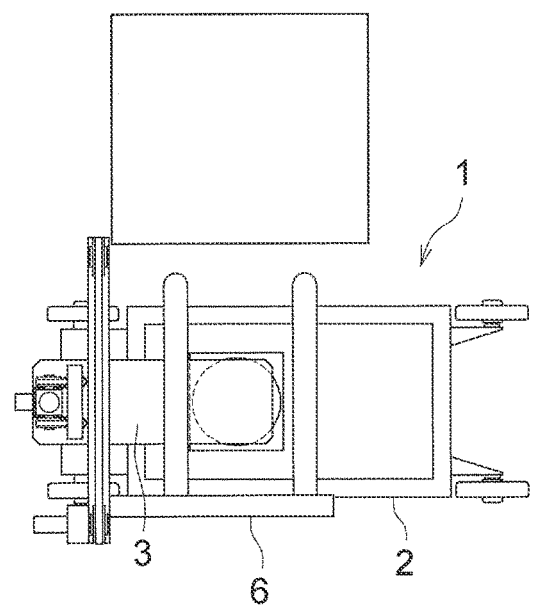
FIG. 12A is a plan view showing a state where the fork has slid to the retracted position during the empty-box skid unloading action of the carrying apparatus.
Figure 12B:
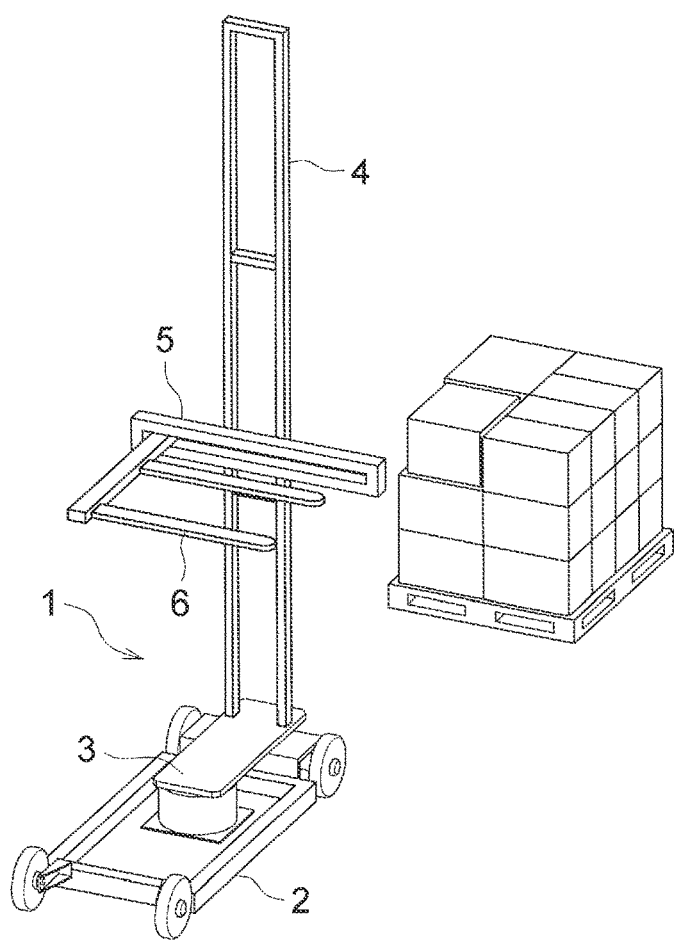
FIG. 12B is a perspective view showing the state where the fork has slid to the retracted position during the empty-box skid unloading action of the carrying apparatus.

In a state where the empty-box skid S is thus placed on the empty-box skid conveyor SC, the sliding motor 55 is activated to slide the fork 6 to the retracted position. Specifically, the prongs 61, 62 of the fork 6 are extracted from the fork pockets FP, FP. FIG. 12A and FIG. 12B are schematic views showing a state where the fork 6 has slid to the retracted position during the empty-box skid unloading action of the carrying apparatus 1. FIG. 12A is a plan view and FIG. 12B is a perspective view. (In FIG. 12A and FIG. 12B, the empty-box skid chute SS is not shown.)

Thus, the operation of carrying one empty-box skid S from the transportation trolley CC to a predetermined empty-box skid chute SS is completed. Thereafter, another empty-box skid S is carried from the transportation trolley CC to a predetermined empty-box skid chute SS in the same manner, and the same operation is repeatedly performed.

Effects of Embodiment

In this embodiment, the swivel base 3 is provided on the trolley 2 so as to be able to swivel around the vertical axis, and the fork 6 can be slid in the horizontal direction between the advanced position and the retracted position by the sliding mechanism 5 capable of moving up and down along the pillar 4 erected on the swivel base 3. Thus, it is possible to realize a configuration in which the empty-box skid S is loaded (received from the transportation trolley CC by the carrying apparatus 1) in one direction and unloaded (unloaded from the carrying apparatus 1 onto the empty-box skid chute SS) in another direction by means of the swiveling swivel base 3, without employing a configuration in which a plurality of members is supported so as to be able to swivel around different vertical axes (the configuration of the carrying apparatus of JP 10-297714 A). There is therefore no member (member supported so as to be able to swivel around the vertical axis) that constitutes an obstacle to lowering the lowest position to which the sliding mechanism 5 can be moved along the pillar 4. As a result, the movable range of the sliding mechanism 5 in the vertical direction (the movable range of the fork 6 in the vertical direction) is not significantly limited, and the transfer position of the empty-box skid S in the vertical direction can be set to a lower position.

The following are effects of the embodiment in comparison with the carrying apparatus of JP 10-297714 A: To move a load in the horizontal direction, the carrying apparatus of JP 10-297714 A requires activating a plurality of motors corresponding to the first to third vertical axes at the same time, which involves complicated control. By contrast, the embodiment requires activating only the sliding motor 55 to move a load (empty-box skid S) in the horizontal direction, and thus can achieve simplification of the control. Since the carrying apparatus of JP 10-297714 A bears the weight of a load by a leading end portion of a plurality of links, it is difficult to increase the allowable weight of a load to be carried. In the embodiment, by contrast, the empty-box skid S is held from below by the fork 6 having the two prongs 61, 62, which makes it possible to stably hold even a heavy empty-box skid S, and to increase the allowable weight of the empty-box skid S to be carried.

In the embodiment, when the fork 6 is at the retracted position, the empty-box skid S held by the fork 6 is located above the center of swiveling O of the swivel base 3. Thus, the swivel base 3 is swiveled in a state where the center of swiveling O of the swivel base 3 and the position of the center of gravity of the empty-box skid S are close to each other, which allows the swivel base 3 to swivel while the empty-box skid S is stably held.

In the embodiment, the sliding mechanism 5 includes the guide members 51, 52 extending toward one side and the other side of the pillar 4 in the horizontal direction and capable of moving up and down along the extension direction of the pillar 4, and the fork 6 is slidable in the horizontal direction along the extension direction of the guide members 51, 52. Thus, when the fork 6 is moved to the advanced position by the sliding mechanism 5, the fork 6 can be located on one side of the pillar 4 in the horizontal direction along the extension direction of the guide members 51, 52. When the fork 6 is moved to the retracted position by the sliding mechanism 5, the fork 6 can be located on the other side of the pillar 4 in the horizontal direction along the extension direction of the guide members 51, 52. This means that the fork 6 has a wide movable range by being able to move toward both one side and the other side of the pillar 4 in the horizontal direction. Accordingly, the carrying apparatus can carry a large-sized empty-box skid S.

In the embodiment, the level of the lower surface of the swivel base 3 is set to a level by a predetermined dimension (slightly) higher than the level of the upper end of the vertical wall 21b of the trolley 2. Thus, when the swivel driving mechanism 31 is activated to swivel the swivel base 3, the swivel base 3 can swivel without interfering with the vertical wall 21b of the trolley 2 by passing above the vertical wall 21b even when the length dimension of the swivel base 3 is relatively large. A greater degree of flexibility is thereby allowed for the size and the range of swiveling of the swivel base 3. Since the swivel driving mechanism 31 on which the swivel base 3 is mounted is installed on the bottom plate 21a located at a lower position than the upper end of the vertical wall 21b of the trolley 2, it is possible to set the installation level of the swivel base 3 to a lower level and thereby contribute to setting the transfer position of the empty-box skid S in the vertical direction to a lower position.

Other Embodiments

The present disclosure is not limited to the above embodiment, and any modifications and applications included in the scope of the claims and an equivalent scope are possible.

For example, in the above embodiment, the case has been described where the present disclosure is applied to the carrying apparatus 1 used to carry the empty-box skid S from the transportation trolley CC to the empty-box skid chute SS at the empty-box return station ST inside an automobile production plant. The carrying apparatus 1 according to the present disclosure is not limited to this example but can also be used in production plants other than an automobile production plant. The present disclosure can also be used as a carrying apparatus that carries a skid that is a pallet with parts boxes containing parts placed thereon (a skid with delivered parts boxes placed thereon).

In the above embodiment, the fork 6 is adopted as the holding member, and the prongs 61, 62 of the fork 6 are inserted into the fork pockets FP, FP of the pallet P to hold and carry the empty-box skid S. The holding member in the present disclosure is not limited to this example but may instead sandwich (hold) a load from right and left sides.

In the above embodiment, the fork pocket detection sensor 7 is a laser sensor. The present disclosure is not limited to this example, and the fork pocket detection sensor 7 may also be an infrared sensor.

The present disclosure is applicable to a carrying apparatus used to carry an empty-box skid from a transportation trolley to an empty-box skid chute.

What is claimed is:

1. A carrying apparatus for carrying a load placed on the carrying apparatus, the carrying apparatus comprising:
    a trolley configured to travel in a front-rear direction;
    a swivel base provided on the trolley so as to be able to swivel around a vertical axis;
    a pillar erected on the swivel base and extending in a vertical direction;
    a holding member configured to hold the load; and
    a sliding mechanism capable of moving up and down along a first extension direction of the pillar and configured to slide the holding member in a horizontal direction between an advanced position at which the load is handed over and a retracted position at which the load is located above the swivel base,
    wherein the sliding mechanism includes a guide member that has an upper guide and a lower guide that extend laterally outward from the pillar in the horizontal direction, wherein both the upper guide and the lower guide are disposed on a first side and a second side of the pillar while moving up and down along the first extension direction of the pillar, and the holding member is configured to be able to slide in the horizontal direction along a second extension direction of the guide member between the advance position and the retracted position,
    wherein a portion of the guide member that extends on the first side of the pillar has a leading end which extends beyond a first side of the trolley,
    wherein the holding member includes: (i) a pair of prongs extending in the horizontal direction and (ii) a coupling part extending in the front-rear direction and that couples together base ends of the pair of prongs, and a rear end of the coupling part, in the front-rear direction, is engaged with the leading end of the guide member, so that guide member is engaged with the holding member, and
    wherein, in the retracted position, the pair of prongs are located so that each one of the pair of prongs is located on an opposite side of a center of swiveling of the swivel base.

2. The carrying apparatus according to claim 1, further comprising
    a control unit that controls the sliding mechanism, wherein:
    the pillar is erected at a position offset from a center of swiveling of the swivel base;
    when the holding member is at the retracted position, the load held by the holding member is located above the center of swiveling; and
    the control unit is configured to control the sliding mechanism so as to move the holding member to the retracted position before the swivel base swivels.

3. The carrying apparatus according to claim 1, wherein:
    the trolley has a bottom plate and a vertical wall extending vertically upward from an outer edge of the bottom plate;
    the carrying apparatus includes a swivel driving mechanism installed on the bottom plate;
    the swivel base is mounted on an upper side of the swivel driving mechanism and configured to be able to swivel by receiving power directed around the vertical axis from the swivel driving mechanism; and
    a lower surface of the swivel base is located at a level higher than an upper end of the vertical wall of the trolley by a predetermined dimension.

* * * * *